United States Patent

[11] 3,632,900

[72] Inventors Fred Kurzweil, Jr. Saratoga; Peter I. Prentky, Los Gatos; Charles E. Hasty, San Jose, all of Calif.
[21] Appl. No. 889,441
[22] Filed Dec. 31, 1969
[45] Patented Jan. 4, 1972
[73] Assignee International Business Machines Corporation Armonk, N.Y.

[54] MAGNETIC TRANSDUCER DISPLACEMENT CONTROL SYSTEM
4 Claims, 1 Drawing Fig.

[52] U.S. Cl. .......... 179/100.2 P, 340/174.1 E
[51] Int. Cl. .......... G11b 5/58
[50] Field of Search .......... 179/100.2 P, 100.2 MI, 100.2 C, 100.2 CA; 340/174.1 E; 346/74 MC; 226/95, 97; 274/4 A, 11 A

[56] References Cited

UNITED STATES PATENTS

| | | | |
|---|---|---|---|
| 3,201,526 | 8/1965 | Wessels et al. | 179/100.2 P |
| 3,526,726 | 9/1970 | Corbett et al. | 179/100.2 CA |
| 3,401,383 | 9/1968 | Ault | 179/100.2 P |
| 3,493,693 | 2/1970 | Balint | 179/100.2 C |

*Primary Examiner*—Terrell W. Fears
*Assistant Examiner*—Alfred H. Eddleman
*Attorneys*—Hanifin and Jancin and Nathan N. Kallman

ABSTRACT: A system for controlling the load force between a magnetic transducer and a magnetic medium is disclosed. The system comprises a means for sensing the force between the magnetic transducer and the magnetic medium and for developing an electrical signal in response thereto, means for producing a reference signal, means for comparing the electrical signal and the reference signal and for developing an error signal therefrom, and actuator means responsive to the error signal for displacing the magnetic transducer relative to the magnetic medium.

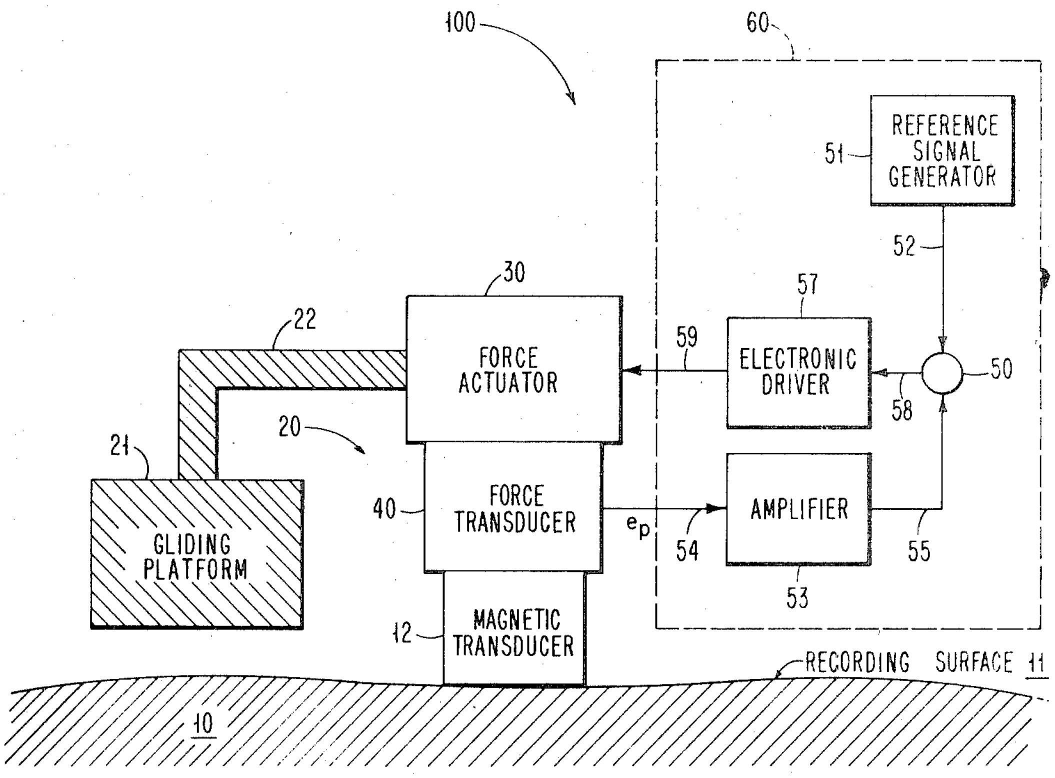
INVENTORS.
FRED KURZWEIL, Jr.
PETER I. PRENTKY
CHARLES E. HASTY
BY Nathan N. Kallman
ATTORNEY

MAGNETIC TRANSDUCER DISPLACEMENT CONTROL SYSTEM

BACKGROUND OF THE INVENTION

1. Field of the Invention

This invention is directed to a system for controlling the force between a magnetic transducer and a magnetic medium and, more particularly, to a system comprising means for sensing the force between the magnetic transducer and the magnetic medium and developing an electrical signal in response thereto, means for producing a reference signal, means for comparing the electrical signal and the reference signal and for developing an error signal therefrom, and actuator means responsive to the error signal for displacing the magnetic transducer relative to the magnetic medium.

2. Description of the Prior Art

Presently, there are three well-known types of magnetic recording systems, using magnetic tapes, drums, or disks, respectively. In each of these systems, one or more magnetic transducers or heads are either in contact with, or are airborne with respect to, a recording medium. In the latter airborne type of system, the magnetic heads "fly" on an air-bearing formed between the medium and the magnetic head structure. Noncontact recording employing air-bearing head assemblies has been utilized in the known magnetic disk type of systems to avoid the deleterious effects of friction and wear which would normally be experienced with a rotating magnetic disk in physical contact with the head.

In addition, it is known that the amplitude of the signal being detected or read out from the rotating disk depends upon the spacing between the magnetic head and the record medium. With known head-mounting techniques, the variation in the spacing causes irregular changes in the strength of the recorded or read signal such as in some cases to cause the signal to be lost altogether; i.e., the larger the distance between the head and the surface of the disk, the lower the signal amplitude. If the disk storage system processes high-density data, then the signal amplitude would necessarily have to be increased to obtain a suitable signal-to-noise ratio. Therefore, it is more desirable that the head be either in contact with or closely spaced from the recording medium so that a signal of suitable amplitude may be obtained. This invention is related to contact recording and is directed toward a system for controlling the force between the magnetic transducer and the magnetic medium.

SUMMARY OF THE INVENTION

An object of this invention is to provide a system for controlling the force between a magnetic transducer and a magnetic medium comprising means for sensing the force between the magnetic transducer and the magnetic medium and for developing an electrical signal in response thereto, means for producing a reference signal, means for comparing the electrical signal and the reference signal and for developing an error signal therefrom, and actuator means responsive to the error signal for displacing the magnetic transducer relative to the magnetic medium so that a predetermined force is achieved therebetween.

In accordance with the preceding object, it is another object of the invention to provide a system of the type set forth wherein the actuator means maintains a substantially constant force between the magnetic transducer and the magnetic medium.

Still another object in connection with the foregoing objects is to provide a system of the type set forth, wherein the force-sensing means is juxtaposed and in physical contact with the magnetic transducer and the actuator means.

Further objects of the invention pertain to the particular arrangement of the part of the system and the several components thereof whereby the above-outlined and additional operating features thereof are attained.

The invention both as to its organization and method of operation, together with further objects and advantages thereof, will best be understood with reference to the following specification taken in connection with the accompanying drawing.

BRIEF DESCRIPTION OF THE DRAWING

The FIGURE is is a diagrammatic view of an embodiment of the system for controlling the force between a magnetic transducer and a magnetic medium incorporating the features of the invention.

DESCRIPTION OF THE INVENTION

Referring now to the drawing and, more particularly to the FIGURE, there is shown a system for controlling the force between a magnetic medium 10 and a magnetic transducer 12. The magnetic medium 10 has a recording surface 11 which, as illustrated, has topographical variations thereon. The magnetic medium 10 may particularly be an annular magnetic disk.

The system, generally designated 100, includes a force actuator 30, a force transducer 40 and an electronic system connected therebetween, generally designated 60. The force actuator 30 is carried by a gliding platform 21 through a rigid mounting arm 22 therebetween. The force actuator 30 comprises the top element of a sandwich-type structure, generally designated 20, which further comprises the magnetic transducer 12 and the force transducer 40. Force transducer 40 is juxtaposed between and in physical contact with the adjacent facing surfaces of the force actuator 30 and the magnetic transducer 12, respectively.

The gliding platform 21 may particularly be a slider in a magnetic recording system. The bottom surface of the platform is separated from the recording surface 11 during the rotational movement of the magnetic medium, the separation being caused by the development of an air-bearing, whereby the bottom surface is known in the art as an "air-breathing surface." The rigid mounting arm 22 extending from the gliding platform 21 holds the transducing surface, or pole tip, of the magnetic transducer 12 in contact with the recording surface 11 of the magnetic medium 10.

The force actuator 30 may particularly comprise a magnetostrictive crystal element or a piezoelectric crystal element and has a conductor bonded thereto for connecting the actuator to the electronic system 60. The outer surfaces of the force actuator characteristically expand or contract in response to the amplitude of an electrical signal applied thereto.

The force transducer 40 may particularly be a strain gauge having solid-state components which senses a force applied to its surface contacting the magnetic transducer 12 and develops an electrical signal in response thereto, the signal being applied to conductor 54.

The electronic system 60 comprises a comparator 50, a reference signal generator 51 and amplifiers 53 and 57. The comparator 50 has two input terminals, one of the terminals being connected to the reference signal generator 51 through a conductor 52 and the other input terminal being connected to the amplifier 53 through conductor 55. The input of amplifier 53 is electrically connected to the output of the force transducer 40 through the conductor 54. The output terminal of the comparator 50 is connected to the electronic driver 57 through conductor 58, the amplified output from driver 57 being applied through conductor 59 to the electronic input conductor of force actuator 30.

In operation, the magnetic transducer 12 initially contacts the recording surface 11 and exerts a predetermined slight force thereon. As the magnetic medium 10 is moved, the transducer must be maintained in a constant-load force contacting relationship with the recording surface so that the strength of the electronic signal derived therefrom for driving the electronics of the magnetic recording apparatus will be kept at the same order of magnitude. However, due to the surface variations in the magnetic medium, the transducer may be displaced from or lose contact with the medium surface or may be mechanically driven into the surface so as to gouge it. This system controls the position of the transducing surface of the magnetic transducer so that it remains substantially in contact with the recording surface at a predetermined constant load force in spite of any surface variations.

The force transducer 40 has one surface which bears against the magnetic transducer 12 and senses the pressure or force exerted on the magnetic transducer by the magnetic medium. Due to the inherent properties of the transducer 40, it develops an electrical signal in response to this force variation. The electrical signal so developed is amplified by amplifier 53 and applied as an input to the comparator 50. The amplified signal is compared therein with a signal from generator 51. The signal generated by reference signal generator 51 has a magnitude that nulls out the amplified signal developed by the force transducer 40 and maintains the magnetic transducer 12 in a contacting relation with the recording surface 11 at the predetermined constant force. Any differences in the magnetic between the amplified electrical signal and the reference signal appears as an error signal at the output of the comparator 50. The error signal is amplified by driver 57 and applied to the force actuator 30. Actuation of the force actuator 30 in response to the error signal causes a corresponding displacement of the surface of the force actuator in contact with the force transducer 40. This displacement is transmitted through the force transducer 40 causing a like displacement in the surface thereof contacting the magnetic transducer 12, thereby to displace the magnetic transducer, whereby to maintain a substantially constant force between the magnetic transducer and the magnetic medium.

The closed-loop control system so described regulates the load force between the recording surface and the magnetic transducer thereby to control the amount of wear between these two magnetic elements. A longer life is given to these respective elements since high pressures and the associated frictional heat generation are eliminated. Furthermore, overall system performance is improved and the magnetic surface can be moved at a higher relative velocity with respect to the magnetic transducer.

From the above, it will be seen that there has been provided a constant-force, head-positioning system for contact recording which fulfills all the objects and advantages set forth above.

While there has been described what is at present considered to be a preferred embodiment of the invention, it will be understood that various modifications may be made therein, and it is intended to cover in the appended claims all such modifications as fall within the true spirit and scope of the invention.

What is claimed is:

1. A system for controlling the force between a magnetic transducer and a magnetic medium in response to undulations in the surface of said magnetic medium, comprising:
   an air-bearing slider positionable in gliding relationship to the surface of said magnetic medium for coarsely following the undulations in said surface;
   means for sensing the force between the magnetic transducer and the magnetic medium and for developing an electrical signal in response thereto;
   means for producing a reference signal;
   means for comparing said electrical signal and said reference signal and for developing a force error signal therefrom; and
   actuator means responsive to said force error signal for finely positioning said magnetic transducer to follow the undulations in said surface of said magnetic medium and for maintaining a substantially constant force between said magnetic transducer and said magnetic medium;
   said force-sensing means comprising solid-state components and being juxtaposed with said magnetic transducer and said actuator means so as to form a sandwiched assembly; said sandwiched assembly being carried by said air-bearing slider.

2. The system set forth in claim 1, wherein said force-sensing means comprises a strain gauge.

3. The system set forth in claim 1, wherein said actuator means comprises a magnetostrictive element.

4. The system set forth in claim 1, wherein said actuator means comprises a piezoelectric element.

* * * * *